Jan. 7, 1958     T. C. HUXLEY III, ET AL     2,818,853
PRESSURE REGULATOR
Filed Nov. 15, 1955
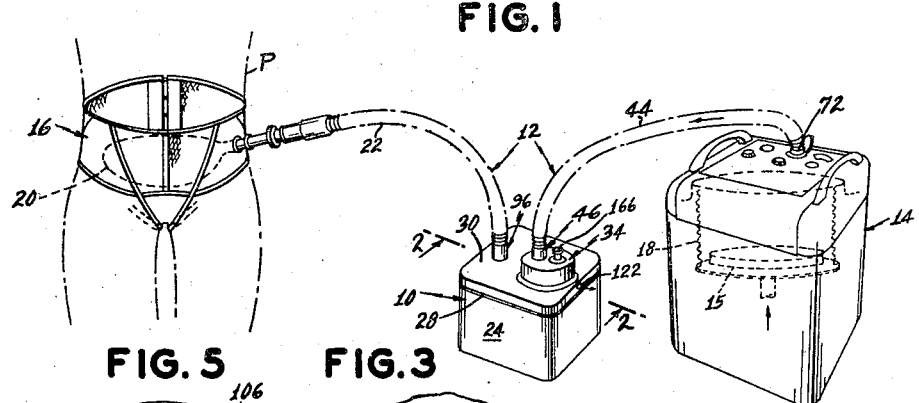
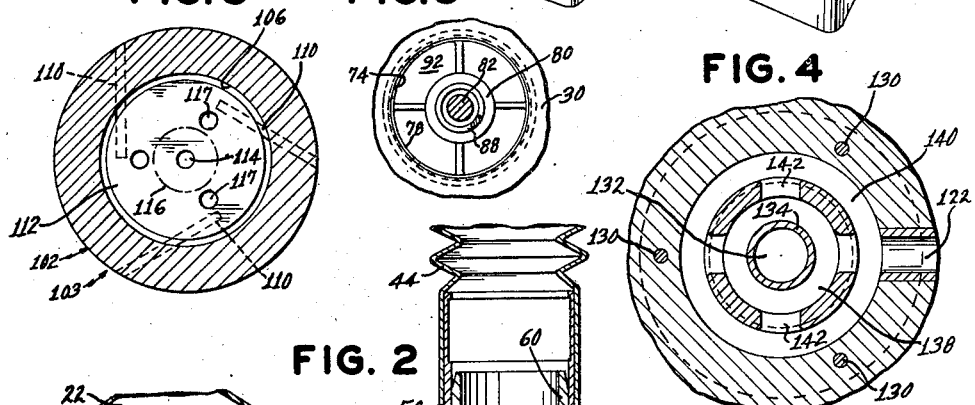
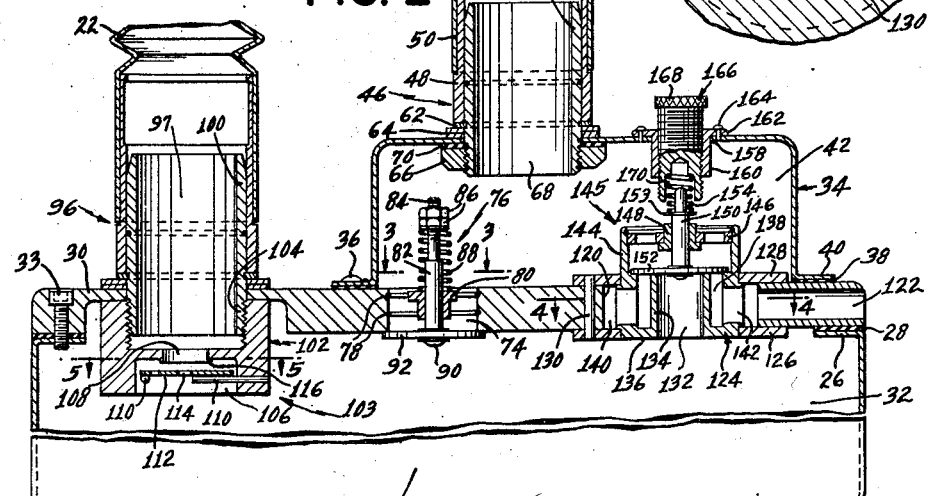
INVENTORS
Thomas C. Huxley III
BY Jack Isreeli
Edwin Leinster & Harry Glen
ATTORNEYS United States Patent Office 2,818,853
Patented Jan. 7, 1958

2,818,853

PRESSURE REGULATOR

Thomas C. Huxley III, Manhasset, and Jack Isreeli, Tuckahoe, N. Y., assignors to Conitech, Ltd., Chauncey, N. Y., a corporation of New York Application November 15, 1955, Serial No. 546,857

15 Claims. (Cl. 128—30)

This invention relates to a pressure regulator and particularly to a pressure regulator suitable for use in artificial respiration apparatus.

In co-pending U. S. patent application, Serial No. 473,868 filed by Thomas C. Huxley III, and now abandoned, a co-inventor herein, a portable artificial respiration apparatus is disclosed. Specifically, this apparatus includes an inflatable belt which is adapted to be secured to the abdomen of a patient and which when inflated induces expiration of the patient thereby assisting the patient to respire or breathe. It has been found that portable respiration apparatus such as the inflatable belt shown and described in the aforementioned co-pending Huxley application operates most efficiently when the belt is inflated for substantially more than half of the complete inflation-deflation cycle of the belt. Since the usual source of supply of air at super atmospheric pressure is a reciprocating pump, it will be obvious to those skilled in the art that air at super atmospheric pressure is supplied from the reciprocating pump for only approximately half of a complete cycle of operation of the pump.

It is therefore one object of the present invention to provide a pressure regulator which is adapted for use with a cyclically operable air pump and which is effective to cyclically supply air at super atmospheric pressure for more than half of the complete cycle of operation of the apparatus.

Another object of the present invention is to provide a pressure regulator which is adapted to be interposed in the supply line from a cyclically or reciprocably operable air pump to artificial respiration apparatus and which is adapted to supply air at super atmospheric pressure to the artificial respiration apparatus for substantially more than half of a complete cycle of operation of the apparatus.

Another object of the present invention is the provision of a pressure regulator which is adapted to regulate the supply of air at super atmospheric pressure to artificial respiration apparatus so that the air at super atmospheric pressure is supplied for substantially more than half the complete cycle of operation of the apparatus and which may be adjusted to regulate the amount of time during which air at superatmospheric pressure is supplied to the artificial respiration device.

Another object of the present invention is the provision of a pressure regulator which is adapted to reduce the pressure in artificial respiration apparatus to substantially atmospheric pressure in a relatively short time.

The above and other objects, features and advantages of the present invention will be more fully understood from the following description considered in connection with the accompanying illustrative drawing.

In the drawing:

Fig. 1 is a perspective view of an artificial respiration apparatus including a pressure regulator embodying the present invention;

Fig. 2 is a sectional view of the pressure regulator shown in Fig. 1, taken along the line 2—2 of Fig. 1;

Fig. 3 is a sectional view, taken along the line 3—3 of Fig. 2;

Fig. 4 is a sectional view, taken along the line 4—4 of Fig. 2; and

Fig. 5 is a sectional view, taken along the line 5—5 of Fig. 2.

Referring now to the drawing in detail, the pressure regulator 10 is shown in Fig. 1 as being interposed in a supply line 12 extending between pumping apparatus 14 and an inflatable belt 16. The pumping apparatus 14 may be of any suitable design and construction and is preferably of the type which supplies air rhythmically or cyclically, first supplying air at super atmospheric pressure for substantially half a cycle and thereafter withdrawing air so as to induce subatmospheric pressure for half a cycle. For instance, pumping apparatus 14 may be of the type shown and described in the co-pending U. S. application, Serial No. 295,181, filed June 24, 1952, by Thomas C. Huxley III, and now Patent No. 2,762,200, one of the co-inventors herein. Such a pump includes a piston 15 which is reciprocably and cyclically operable to extend and compress a flexible cylinder or bellows 18 to induce negative and positive pressures, respectively. The portable respirator belt as hereinbefore mentioned is preferably of the type shown and described in the aforementioned U. S. patent application Serial No. 473,868. Such a belt comprises an outer casing which is adapted to be secured in body encircling relation with the patient P and has disposed within the belt an inflatable bladder 20 which is coupled to the hose or conduit 22 of air supply line 12. If a more detailed description is desired of the inflatable belt 16, reference may be had to U. S. Patent No. 2,762,366, which shows a belt of the same construction as that shown in the aforementioned application.

Pressure regulator 10 comprises a main housing 24 having an integral inturned flange 26 around the top edge thereof. A gasket 28 overlies flange 26 and a top plate 30 overlies the gasket 28 and is secured to main housing 24 as by a plurality of screws 33. The pressure regulator structure heretofore described defines a main chamber or reservoir 32 which, for reasons made clear hereinafter, contains air at pressure never below atmospheric pressure. Overlying a portion of top plate or member 30 is an auxiliary housing 34 which is secured to the top plate 30 as by screws 36, a gasket 38 being interposed between the flange 40 of auxiliary housing 34 and top plate 30 so as to render the connection air tight. Auxiliary housing 34 and top plate 30 define therebetween an auxiliary air chamber or reservoir 42. Hose or conduit 44 forming the portion of air supply line 12 extending from the air pump 14 to pressure regulator 10 is preferably flexible and resilient and may be of the corrugated type and altogether similar to hose or conduit 22. Hose or conduit 44 may be connected to auxiliary housing 34 in any suitable manner and is preferably secured thereto by means of a coupling having a female member 48 over which the end portion 50 of hose 44 is disposed in telescoping relation therewith. Female part 48 of coupling 46 is adapted to be connected to a male part 60 of the coupling which is secured to auxiliary housing 34 by means of snap ring 62, washers 64 and nut 66 so as to define an air passage or inlet 68 into the auxiliary chamber 42. As best seen in Fig. 2, a gasket 70 is interposed between nut 66 and housing 34 so as to make the connection of the male coupling part 60 with auxiliary housing 34 air-tight in order to prevent leakage of air out of the auxiliary reservoir 42. It is to be noted that preferably the means for connecting the end 72 of conduit or hose 44 to the pump 14 is substantially identical to the means for connecting end 50 of conduit 44 to the auxiliary casing 34 so that the parts may be readily interchanged. By means of the conduit 44 and of the couplings for securing the conduit to the pump 14 and to the auxiliary housing 34, air supplied from the pump 14 is directed into auxiliary chamber 42 through the air passage 68 in the auxiliary housing 34. Plate 30 is provided with an aperture 74 in order to provide a suitable inlet or passage for air to move from the auxiliary chamber 42 into the main chamber 32. The passage of air between the two chambers is controlled by a reservoir inlet valve assembly 76, the construction of which and the function of which will be described below.

Disposed in fixed relation to the wall of air passage 74 is a pair of vertically spaced spoked snap rings 78 which function to support a bearing member 80 disposed concentrically within the air passage 74. Slidably disposed within the bearing 80 is a valve stem 82 which is provided with a threaded end portion 84 on which is threadedly secured a pair of lock nuts 86 to provide a suitable shoulder for a biasing spring 88 disposed around the valve stem. The other end of spring 88 bears against fixed bearing member 80 and, accordingly, spring 88 biases the valve stem upwardly as viewed in Fig. 2. Mounted on the lower end of valve stem 82 by any suitable means such as a screw 90 is a valve 92 having a diameter which is slightly larger than the diameter of passage 74 in plate 30. By means of the biasing spring 88, valve 92 is normally held in close air-tight engagement with the lower surface of plate 30 to thereby close passage 74 and prevent air from passing from the auxiliary chamber 42 into the main chamber 32. However, when the pressure in auxiliary reservoir 42 is a predetermined amount greater than in the main reservoir 32, the pressure is effective for forcing valve 92 away from plate 30 to thereby permit air to pass relatively unrestrictedly from the auxiliary reservoir into the main reservoir. It is to be noted that the necessary pressure differential between the the two chambers for operating the valve to its open position may be adjusted by adjusting the position of lock nuts 86 on valve stem 82 to thereby adjust the biasing force of spring 88. For reasons which will be made clear hereinafter, valve assembly 76 is preferably arranged to permit valve 92 to be opened by a very small pressure differential between the auxiliary chamber and the main chamber. Accordingly, when air is being supplied to the auxiliary chamber at pressures above atmospheric pressure, valve 92 is open to thereby permit air at super atmospheric pressure to enter main chamber 32.

As heretofore mentioned, main chamber 32 is connected to the inflatable belt 16 by means of conduit or hose 22. A coupling 96 which is preferably of substantially identical construction to coupling 46 hereinbefore described is employed to couple the end of hose 22 to the chamber 32. The major difference between the coupling 96 and the coupling 46 is that instead of securing the male member 100 of coupling 96 to top plate 30 by means of a nut similar to nut 66, a threaded valve body 102 of a flutter valve assembly 103 threadedly engages portion 104 of male part 100 in order to secure the male part of the top plate. Valve body 102 defines a hollow or recess 106 which is in communication with conduit 22 by means of an air passage or outlet 108. Extending into the recess 106 are a plurality of rods 110 which are adapted to support a flutter valve 112 in its lowered position as shown in Fig. 2. Flutter valve 112 is of smaller diameter than the diameter of recessed portion 106 so as to provide for clearance around the peripheral edge of the flutter valve for passage of air therearound in a manner to be described subsequently. Furthermore, flutter valve 112 is provided with a central aperture 114 which is in registry with passage 108 in valve body 102 to thereby permit the passage of air into and out of belt 16 at all times. Moreover, flutter valve 112 is provided with a plurality, here shown as three in number, of relatively small apertures 117 which are spaced evenly in the flutter valve and outwardly from the center thereof and which are so disposed as to be out of registry with passage 108. As will be understood more fully hereinafter, when the main chamber 32 contains air at super atmospheric pressure, flutter valve 112 is in its raised position in which it engages valve seat 116 of valve body 102 and thereby permits the passage of air from reservoir 32 into tube 22 only through central aperture 114 which flow is relatively restricted. When the pressure in chamber 32 is equal to or less than the pressure in conduit 22, then flutter valve 112 is in its lower position resting on rods 110, as shown in Fig. 2. In the lowered position, flutter valve 112 permits air to pass from belt 16 into main chamber 32 not only through central aperture 114 but through spaced apertures 117 and around the peripheral edge of the flutter valve thereby providing for a relatively unrestricted air flow to rapidly vent the belt to the main chamber 32. The purpose of this will become more clear hereinafter when the actual operation of the pressure regulator is described in detail.

In addition to the apparatus hereinbefore described, means is provided for at times venting the entire apparatus to atmosphere in order to reduce the pressure in the belt to atmospheric pressure so as to deflate the belt and permit inspiration. In order to mount the venting means comprising venting valve assembly 145, plate 30 is provided with a relatively large aperture 120 extending between main reservoir 32 and auxiliary reservoir 42. Aperture 120 is in communication with the outside atmosphere by means of a port or vent 122 which extends from aperture 120 to the outside of the apparatus in a direction substantially parallel to the surface of the top plate 30. Disposed concentrically within aperture 120 is a valve body 124 which is supported in its concentric disposition by a pair of flanges 126 and 128 which are respectively disposed adjacent the bottom and top surfaces of top plate 30 and are secured in said disposition by means of a plurality of pins or rivets 130 extending through said flanges and said top plate 30. Valve body 124 is provided with a central passage 132 which is in communication with the main chamber 32. A central wall 134 extends upwardly from the bottom 136 of valve body 124 to isolate said passage 132 from a concentric passage 138 which is in communication with auxiliary chamber 42, and is also in communication with the hollow passage 140 defined by the space between the fixture and the outer periphery of aperture 120, a plurality of vents 142 connecting the two passages as best shown in Fig. 4. Valve body 124 is provided with an upwardly extending peripherally continuous wall 144 which has mounted thereon a plurality of radially spaced members 146 adapted to support a bearing member 148 in much the same way as bearing member 80 is supported in valve assembly 76. A valve stem 150 is slidably disposed in bearing 148 and has mounted at the lower end thereof a valve 152 which valve has a radius that is larger than the radius of passage 138 and which, in its normal position as shown in Fig. 2, overlies passages 132 and 138 to thereby prevent air from passing from either reservoir to the outer atmosphere through said passages and through the vent 122. Valve stem 150 is provided intermediate its two ends with a flange 153 which is adapted to serve as a shoulder for a biasing spring 154 which, as will become clear hereinafter, serves to normally bias valve 152 into its normal position. Auxiliary housing 34 is provided in the top thereof with an aperture 158 which has disposed therewithin an internally threaded member 160 provided with flanges 162 which overlie the top of auxiliary casing 34. Internally threaded member 160 is secured to the auxiliary casing by means of rivets 164 which extend through the flanges 162 of member 160 and also through the top of auxiliary casing 34. Threadedly mounted in member 160 is an adjusting screw 166 which is externally threaded and which is adapted to threadedly engage member 160 and to move longitudinally when screw 166 is rotated by gripping and turning knurled head 168 thereof. Preferably, threaded screw 166 is provided with a recessed portion 170 adjacent the bottom thereof which recessed portion serves as a seat for biasing spring 154. Accordingly, the biasing spring is positioned between the flange 153 on valve stem 150 and the top surface of recessed portion 170 of screw 166, and valve 152 moves upwardly from fixture 124 when the pressure in chamber 32 exceeds the pressure in chamber 42 by an amount equal to the force exerted by spring 154 on the valve. Accordingly, since screw 166 may be moved longitudinally by rotating it, the tension in spring 154 may be adjusted to thereby adjust the pressure differential at which valve 152 will move out of its normal position as shown in Fig. 2 to its raised position. When the valve moves out of its normal position air in main reservoir 32 is vented to atmosphere by flowing upwardly through passage 132, downwardly through passage 138, through passages 142, through circular passage 140, to vent 122 and out to atmosphere, thereby venting the chamber 32 to atmosphere. Passages 132, 138, 140 and 142 and vent 122 are all proportioned to permit air to flow therethrough relatively unrestrictedly. Moreover, when valve 152 is moved out of its normal position, air may flow with relatively no restriction from the atmosphere, through vent 122, passage 140, passages 142, passage 138 into auxiliary chamber 42 as well as flow from the main reservoir into the auxiliary reservoir, to thereby supply pump 14 with air during its return or negative pressure stroke. Preferably, for reasons which will become clear hereinafter when the operation of the pressure regulator is described in detail, threaded cap screw 166 is adjusted so as to fix the tension of spring 154 so that valve 152 opens when the pump 14 is exerting substantial negative pressure; for instance, the valve may be adjusted to open when the piston in pump 14 has moved approximately one-third of its return stroke in which negative pressure is induced in the auxiliary chamber 42 by withdrawal of air therefrom.

The operation of the pressure regulator will now be described in detail. For a starting point in the explanation of the operation of the pressure regulator let it be assumed that the piston is at its extreme lower position as shown in Fig. 1 in which, as is well known to those skilled in the art, air is neither being withdrawn from nor introduced into the auxiliary reservoir. At this time, for reasons which will become clear hereinafter, the entire apparatus is at atmospheric pressure and valves 92 and 152 are closed as shown in Fig. 2 and flutter valve 112 is resting on rods 110. As the piston commences its positive stroke, that is as it commences moving upward as viewed in Fig. 1, air at super atmospheric pressure is forced through conduit 44 into auxiliary chamber 42 of the pressure regulator. Almost as soon as the air at super atmospheric pressure enters the auxiliary chamber, the pressure is sufficient to overcome the bias of spring 88 in valve assembly 76 and thereby cause valve 92 to move away from the bottom surface of plate 30 so as to open the valve and permit said air at super atmospheric pressure to flow substantially unrestrictedly into main chamber 32. Of course, at this time, the valve 152 remains closed since the air at super atmospheric pressure in the auxiliary chamber tends to assist the spring 154 in valve assembly 145 and, accordingly, tends to press valve 152 against its seat more firmly. As air at super atmospheric pressure enters chamber 32, flutter valve 112 moves upwardly off pins 110 due to the force of the air at super atmospheric pressure which is sufficient to overcome the relatively light weight of said flutter valve. Accordingly, spaced apertures 117 in the flutter valve provide no means for air to pass out of the chamber and the only exit for air in chamber 32 is through central aperture 114 in flutter valve 112. However, as stated earlier, aperture 114 is relatively small and, therefore, tends to restrict the passage of air therethrough into conduit 22 and to abdominal inflatable belt 16. Therefore, air at super atmospheric pressure tends to collect in the main chamber during the positive stroke of the piston. Therefore, during the substantially entire positive stroke of the piston, air at positive or super atmospheric pressure is being supplied to the belt.

As the piston comes to the end of its positive stroke, that is when the piston reaches the top of its stroke, the pressure of the air in auxiliary chamber 42 tends to be the same as the pressure of the air in main chamber 32 and, accordingly, spring 88 in valve assembly 76 is once more effective to move valve 92 to its closed or normal position as shown in Fig. 2 to thereby prevent further passage of air between the auxiliary and main chambers. However, since there has been a build up of air at super atmospheric pressure in main reservoir 32, after the valve 92 closes compressed air continues to flow from the main chamber through central aperture 114 in flutter valve 112 and through conduit 22 to the abdominal belt 16 thereby continuing to inflate the belt and continuing to induce the patient to exhale. The supply of air at super atmospheric pressure to belt 16 will continue for some time after the piston has reached the end of its positive stroke and, in fact, by properly adjusting screw 166, will continue during a portion of the return or negative stroke of the piston.

As the piston commences its negative stroke, that is as the piston commences moving downwardly as viewed in Fig. 1, the pressure in the auxiliary reservoir 42 starts to drop and it soon becomes lower than atmospheric. The pressure reduction in the auxiliary reservoir does not affect the pressure in the main reservoir since the two chambers are at this time sealed off by valves 92 and 152 which are both closed. However, at some time during the negative stroke of the piston, the pressure in auxiliary chamber 42 will be sufficiently low so that the pressure differential between the main and auxiliary chambers is sufficient to overcome the bias of spring 154 of the valve assembly 145. Accordingly, valve 152 is forced upwardly away from its seat and thereby permits the substantially unrestricted passage of air through channel 132, channel 138, channel 142 and out through vent 122 to thereby rapidly vent the entire main chamber to atmosphere. As soon as the valve 152 opens to permit venting of the main chamber to atmosphere, the pressure in the main chambers drops sufficiently to cause flutter valve 112 to drop back onto supporting pins 110 and thereby permit a rapid venting to atmosphere of the air at super atmospheric pressure in the belt 16 and in conduit 22, the air in said belt and conduit passing through passage 97 and through central aperture 114 and spaced apertures 117 in the flutter valve and around the periphery of the flutter valve which, as already stated, is smaller in diameter than the recess 106 in valve body 102. Therefore, the pressure in the belt rapidly drops to atmospheric pressure and thereby permits a rapid contraction of the belt so that the patient may inhale. Furthermore, when valve 152 moves off its seat to permit venting of main chamber 32, auxiliary chamber 42 is also vented to atmosphere due to the passage of air around the outer periphery of valve 152 and then through the various passages in fixture 124 and vent 122 as well as from the main reservoir. The venting of auxiliary chamber 42 and also of conduit 44 is a highly desirable feature of the present invention since when the piston once again commences its positive stroke it will not first have to supply air to fill up a partial vacuum induced during the return stroke of the piston but will immediately commence to supply air to the pressure regulator at super atmospheric pressure. Accordingly, there will be little or no lost motion or time in the transition of the piston from withdrawing air to the time that the piston supplies air at positive pressure.

After the main and auxiliary chambers 32 and 42, respectively, are vented to atmosphere, then spring 154 in valve assembly 145 is once again effective for moving valve 152 back to its closed position as shown in Fig. 2, thereby restoring the apparatus to the initial condition or position in the cycle as hereinbefore described. Accordingly, the apparatus is again in condition to repeat the cycle above described.

From the foregoing description it will be seen that by employing flutter valve 112 with a small central aperture 114 and a plurality of spaced apertures 117, means is provided for supplying air at positive or super atmospheric pressures to belt 16 for a substantially long time and for rapidly venting the air at positive pressure from the belt to atmosphere so as to rapidly cause the belt to contract to its normal deflated condition. By so proportioning flutter valve 112, it will be seen that air at positive pressure is supplied to belt 16 for a relatively long time covering more than the time of the positive stroke of the piston and the belt is deflated for a relatively short time which is less than the time of the return stroke of the piston. In this manner the primary object of the invention is accomplished so as to provide exhalation or expiration by the patient for more than half of the complete breathing cycle.

While we have herein shown and described one form of the present invention, it will be understood that various changes and modifications may be made therein within the scope of the appended claims without departing from the spirit and scope of this invention.

Having thus described our invention, what we claim and desire to secure by Letters Patent is:

1. A pressure regulator comprising a reservoir having an inlet adapted to be operatively connected to a cyclically operable pump which at times supplies compressible fluid at super atmospheric pressure and at other times withdraws said fluid, said reservoir being further provided with an outlet, means for permitting substantially unrestricted flow of said fluid at super atmospheric pressure into said reservoir through said inlet, means for preventing the withdrawal of said fluid from said reservoir through said inlet, and means for restricting the flow of fluid at super atmospheric pressure out of said reservoir through said outlet, whereby the flow of said fluid out of said reservoir is of greater duration than the flow of said fluid into said reservoir, and means for venting said reservoir to the atmosphere, said last mentioned means being operable only during the time said pump is operating to withdraw fluid and being effective a predetermined time after said portion of the pump cycle commences, whereby to discontinue the flow of said fluid at super atmosphereic pressure out of said reservoir through said outlet.

2. A pressure regulator comprising a reservoir having an inlet adapted to be operatively connected to a cyclically operable pump which at times supplies compressible fluid at super atmospheric pressure and at other times withdraws said fluid, said reservoir being further provided with an outlet, adapted to be connected to fluid containing means, means for permitting substantially unrestricted flow of said fluid at super atmospheric pressure into said reservoir through said inlet, means for preventing the withdrawal of said fluid from said reservoir through said inlet, means for permitting restricted flow of fluid from said reservoir to said fluid containing means through said outlet when the pressure in said reservoir exceeds the pressure in said fluid containing means, whereby the flow of fluid out of said reservoir through said outlet is of greater duration than the flow of said fluid into said reservoir through said inlet, means for at times venting said reservoir to atmosphere, and means for permitting the unrestricted flow of said fluid from said fluid containing means into said reservoir through said outlet when said venting means is effective, whereby to permit the fluid to flow out of said fluid containing means faster than it flows into said fluid containing means.

3. A pressure regulator comprising a reservoir having an inlet adapted to be operatively connected to a cyclically operable pump which at times supplies compressible fluid at superatmospheric pressure and at other times withdraws said fluid, said reservoir being further provided with an outlet, means for permitting substantially unrestiricted flow of fluid into said reservoir through said inlet when the pressure of the fluid supplied by said pump exceeds the pressure in said reservoir by a predetermined amount, means for preventing the flow of the fluid out of said reservoir through said inlet, means for permitting the restricted flow of fluid out of said reservoir through said outlet when the pressure in said reservoir exceeds the pressure outside said outlet, whereby the time fluid flows out of said reservoir through said outlet exceeds the time fluid flows into said reservoir through said inlet, means permitting substantially unrestricted flow of said fluid into said reservoir through said outlet when the pressure outside said outlet exceeds the pressure within said reservoir, and means for venting said reservoir to atomsphere effective when the pressure within the reservoir exceeds the pressure outside said inlet by a predetermined amount, whereby to discontinue the flow of fluid from said reservoir through said outlet a predetermined time after said pump commences to withdraw fluid, whereby fluid flows out of said reservoir through said outlet for more than half of said pump cycle.

4. A pressure regulator comprising a reservoir having an inlet adapted to be operatively connected to a cyclically operable pump which at times supplies compressible fluid at super atmospheric pressure and at other times withdraws said fluid, said reservoir being further provided with an outlet, means for permitting substantially unrestricted flow of fluid into said reservoir through said inlet when the pressure of the fluid supplied by said pump exceeds the pressure in said reservoir by a predetermined amount, means for preventing the flow of the fluid out of said reservoir through said inlet, means for permitting the restricted flow of fluid out of said reservoir through said outlet when the pressure in said reservoir exceeds the pressure outside said outlet, whereby the time fluid flows out of said reservoir through said outlet exceeds the time fluid flows into said reservoir through said inlet, means permitting substantially unrestricted flow of said fluid into said reservoir through said outlet when the pressure outside said outlet exceeds the pressure within said reservoir, and means for venting said reservoir to atmosphere effective when the pressure within the reservoir exceeds the pressure outside said inlet by a predetermined amount, whereby to discontinue the flow of fluid from said reservoir through said outlet a predetermined time after said pump commences to withdraw fluid, whereby fluid flows out of said reservoir through said outlet for more than half of said pump cycle, and means for adjusting said venting means to alter the pressure differential necessary to render said venting means operable, whereby to adjust the duration of fluid flow out of said reservoir through said outlet.

5. A pressure regulator comprising a reservoir having an inlet adapted to be operatively connected to a cyclically operable pump which at times supplies compressible fluid at super atmospheric pressure and at other times withdraws said fluid, said reservoir being further provided with an outlet, valve means controlling the flow of said fluid through said inlet, said valve means being arranged to prevent the passage of fluid out of said reservoir through said inlet and to permit the substantially unrestricted passage of fluid into said reservoir through said inlet when the pressure outside said inlet exceeds the pressure inside said reservoir by a predetermined amount, another valve means for controlling the flow of fluid through said outlet, said other valve means being arranged to permit the restricted flow of fluid out of said reservoir through said outlet when the pressure within said reservoir exceeds the pressure outside and to permit the substantially unrestricted flow of fluid into said reservoir through said outlet when the pressure outside said outlet is greater than the pressure in said reservoir, whereby said fluid flows into said reservoir through said inlet substantially faster than said fluid flows out of said reservoir through said outlet, and a third valve means for venting said reservoir to atmosphere, said third valve means being effective only when the pressure within said reservoir exceeds the pressure outside said inlet by a predetermined amount, whereby said reservoir is vented only during the part of said pump cycle when said pump is effective for withdrawing fluid.

6. A pressure regulator comprising a reservoir having an inlet adapted to be operatively connected to a cyclically operable pump which at times supplies compressible fluid at super atmospheric pressure and at other times withdraws said fluid, said reservoir being further provided with an outlet, valve means controlling the flow of said fluid through said inlet, said valve means being arranged to prevent the passage of fluid out of said reservoir through said inlet and to permit the substantially unrestricted passage of fluid into said reservoir through said inlet when the pressure outside said inlet exceeds the pressure inside said reservoir by a predetermined amount, another valve means for controlling the flow of fluid through said outlet, said other valve means being arranged to permit the restricted flow of fluid out of said reservoir through said outlet when the pressure within said reservoir exceeds the pressure outside said outlet and to permit the substantially unrestricted flow of fluid into said reservoir through said outlet when the pressure outside said outlet is greater than the pressure in said reservoir, whereby said fluid flows into said reservoir through said inlet substantially faster than said fluid flows out of said reservoir through said outlet, and a third valve means for venting said reservoir to atmosphere, said third valve means being effective only when the pressure within said reservoir exceeds the pressure outside said inlet by a predetermined amount, whereby said reservoir is vented only during the part of said pump cycle when said pump is effective for withdrawing fluid, and means for adjusting said third valve means so that the latter will be effective at a predetermined pressure differential within a predetermined range of pressure differentials, whereby to adjust the duration of the flow of fluid out of said reservoir through said outlet.

7. A pressure regulator comprising a main housing defining a main reservoir and an auxiliary housing defining an auxiliary reservoir, means adapted to couple said auxiliary reservoir to a cyclically operable pump which at times supplies air at super atmospheric pressure to said auxiliary reservoir and at other times withdraws air therefrom, said regulator having an air passage communicating with said main and auxiliary reservoirs and being proportioned to permit relatively unrestricted flow of air therebetween, a valve associated with said air passage, said valve being normally closed and being open only when the pressure in said auxiliary reservoir exceeds the pressure in said main reservoir, whereby to permit air flow through said passage from said auxiliary reservoir into said main reservoir, said main reservoir being provided with an outlet, another valve associated with said outlet for controlling the air flow therethrough, said other valve being adapted to permit the restricted flow of air out of said main reservoir through said outlet when the pressure in said main reservoir exceeds the pressure outside said outlet and to permit the relatively unrestricted flow of air into said main reservoir through said outlet when the pressure outside said outlet exceeds the pressure within said main reservoir, whereby air flows out of said main reservoir through said outlet for a longer time than air flows into said main reservoir through said air passage, and means for periodically rapidly reducing the pressure in said main reservoir, said last mentioned means being effective only when the pressure in said main reservoir exceeds the pressure in said auxiliary reservoir by a predetermined amount.

8. A pressure regulator comprising a main housing defining a main reservoir and an auxiliary housing defining an auxiliary reservoir, means adapted to couple said auxiliary reservoir to a cyclically operable pump which at times supplies air at super atmospheric pressure to said auxiliary reservoir and at other times withdraws air therefrom, said regulator having an air passage communicating with said main and auxiliary reservoirs and being proportioned to permit relatively unrestricted flow of air therebetween, a valve associated with said air passage, said valve being normally closed and being open only when the pressure in said auxiliary reservoir exceeds the pressure in said main reservoir, whereby to permit air flow through said passage from said auxiliary reservoir into said main reservoir, said main reservoir being provided with an outlet, another valve associated with said outlet for controlling the air flow therethrough, said other valve being adapted to permit the restricted flow of air out of said main reservoir through said outlet when the pressure in said main reservoir exceeds the pressure outside said outlet and to permit the relatively unrestricted flow of air into said main reservoir through said outlet when the pressure outside said outlet exceeds the pressure within said main reservoir, whereby air flows out of said main reservoir through said outlet for a longer time than air flows into said main reservoir through said air passage, and means for periodically rapidly reducing the pressure in said main reservoir, said last mentioned means being effective only when the pressure in said main reservoir exceeds the pressure in said auxiliary reservoir by a predetermined amount, and means for adjusting said last mentioned means to adjust the pressure differential rendering said last mentioned means effective.

9. A pressure regulator comprising a main housing defining a main reservoir and an auxiliary housing defining an auxiliary reservoir, means adapted to couple said auxiliary reservoir to a cyclically operable pump which at times supplies air at superatmospheric pressure to said auxiliary reservoir and at other times withdraws air therefrom, said regulator having an air passage communicating with said main and auxiliary reservoirs and being proportioned to permit relatively unrestricted flow of air therebetween, a valve associated with said air passage, said valve being normally closed and being open only when the pressure in said auxiliary reservoir exceeds the pressure in said main reservoir, whereby to permit air flow through said passage from said auxiliary reservoir into said main reservoir, said main reservoir being provided with an outlet, another valve associated with said outlet for controlling the air flow therethrough, said other valve being adapted to permit the restricted flow of air out of said main reservoir through said outlet when the pressure in said main reservoir exceeds the pressure outside said outlet and to permit the relatively unrestricted flow of air into said main reservoir through said outlet when the pressure outside said outlet exceeds the pressure within said main reservoir, whereby air flows out of said main reservoir through said outlet for a longer time than air flows into said main reservoir through said air passage, and means for periodically rapidly venting said main reservoir to atmosphere, said last mentioned means being effective only when the pressure in said main reservoir exceeds the pressure in said auxiliary reservoir by a predetermined amount.

10. A pressure regulator comprising a main housing defining a main reservoir and an auxiliary housing defining an auxiliary reservoir, means adapted to couple said auxiliary reservoir to a cyclically operable pump which at times supplies air at superatmospheric pressure to said auxiliary reservoir and at other times withdraws air therefrom, said regulator having an air passage communicating with said main and auxiliary reservoirs and being proportioned to permit relatively unrestricted flow of air therebetween, a valve associated with said air passage, said valve being normally closed and being open only when the pressure in said auxiliary reservoir exceeds the pressure in said main reservoir, whereby to permit air flow through said passage from said auxiliary reservoir into said main reservoir, said main reservoir being provided with an outlet, another valve associated with said outlet for controlling the air flow therethrough, said other valve being adapted to permit the restricted flow of air out of said main reservoir through said outlet when the pressure in said main reservoir exceeds the pressure outside said outlet and to permit the relatively unrestricted flow of air into said main reservoir through said outlet when the pressure outside said outlet exceeds the pressure within said main reservoir, whereby air flows out of said main reservoir through said outlet for a longer time than air flows into said main reservoir through said air passage, and means for periodically rapidly venting said main reservoir and said auxiliary reservoir to atmosphere, said last mentioned means being effective only when the pressure in said main reservoir exceeds the pressure in said auxiliary reservoir by a predetermined amount.

11. A pressure regulator comprising a main housing defining a main reservoir and an auxiliary housing defining an auxiliary reservoir, means adapted to couple said auxiliary reservoir to a cyclically operable pump which at times supplies air at superatmospheric pressure to said auxiliary reservoir and at other times withdraws air therefrom, said regulator having an air passage communicating with said main and auxiliary reservoirs and being proportioned to permit relatively unrestricted flow of air therebetween, a valve associated with said air passage, said valve being normally closed and being open only when the pressure in said auxiliary reservoir exceeds the pressure in said main reservoir, whereby to permit air flow through said passage from said auxiliary reservoir into said main reservoir, said main reservoir being provided with an outlet, an other valve associated with said outlet for controlling the air flow therethrough, said other valve being adapted to permit the restricted flow of air out of said main reservoir through said outlet when the pressure in said main reservoir exceeds the pressure outside said outlet and to permit the relatively unrestricted flow of air into said main reservoir through said outlet when the pressure outside said outlet exceeds the pressure within said main reservoir, whereby air flows out of said main reservoir through said outlet for a longer time than air flows into said main reservoir through said air passage, and means for periodically rapidly venting said main reservoir and said auxiliary reservoir to atmosphere, said last mentioned means being effective only when the pressure in said main reservoir exceeds the pressure in said auxiliary reservoir by a predetermined amount, and means for adjusting said last mentioned means to adjust the pressure differential rendering said last mentioned means effective.

12. A pressure regulator comprising a main housing defining a main reservoir and an auxiliary housing defining an auxiliary reservoir, means adapted to couple said auxiliary reservoir to a cyclically operable pump which at times supplies air at superatmospheric pressure to said auxiliary reservoir and at other times withdraws air therefrom, said regulator having an air passage communicating with said main and auxiliary reservoirs and being proportioned to permit relatively unrestricted flow of air therebetween, a valve associated with said air passage, said valve being normally closed and being open only when the pressure in said auxiliary reservoir exceeds the pressure in said main reservoir, whereby to permit air flow through said passage from said auxiliary reservoir into said main reservoir, said main reservoir being provided with an outlet, another valve associated with said outlet for controlling the air flow therethrough, said other valve being adapted to permit the restricted flow of air out of said main reservoir through said outlet when the pressure in said main reservoir exceeds the pressure outside said outlet and to permit the relatively unrestricted flow of air into said main reservoir through said outlet when the pressure outside said outlet exceeds the pressure within said main reservoir, whereby air flows out of said main reservoir through said outlet for a longer time than air flows into said main reservoir through said air passage, said regulator being further provided with another passage communicating with said main and auxiliary reservoirs and an atmosphere vent communicating with said other passage, a third valve means associated with said vent and said other passage, said third valve means normally closing said other passage and normallly isolating said vent from said other passage, said third valve means being operable to open said other passage and to permit communication of said other passage with said vent when the pressure in said main reservoir exceeds the pressure in said auxiliary reservoir by a predetermined amount, whereby to vent said main and auxiliary reservoirs to atmosphere during a part of the time said pump is effective for withdrawing air from said auxiliary reservoir.

13. A pressure regulator comprising a main housing defining a main reservoir and an auxiliary housing defining an auxiliary reservoir, means adapted to couple said auxiliary reservoir to a cyclically operable pump which at times supplies air at super atmospheric pressure to said auxiliary reservoir and at other times withdraws air therefrom, said regulator having an air passage communicating with said main and auxiliary reservoirs and being proportioned to permit relatively unrestricted flow of air therebetween, a valve associated with said air passage, said valve being normally closed and being open only when the pressure in said auxiliary reservoir exceeds the pressure in said main reservoir, whereby to permit air flow through said passage from said auxiliary reservoir into said main reservoir, said main reservoir being provided with an outlet, another valve associated with said outlet for controlling the air flow therethrough, said other valve being adapted to permit the restricted flow of air out of said main reservoir through said outlet when the pressure in said main reservoir exceeds the pressure outside said outlet and to permit the relatively unrestricted flow of air into said main reservoir through said outlet when the pressure outside said outlet exceeds the pressure within said main reservoir, whereby air flows out of said main reservoir through said outlet for a longer time than air flows into said main reservoir through said air passage, said regulator being further provided with another passage communicating with said main and auxiliary reservoirs and an atmosphere vent communicating with said other passage, a third valve means associated with said vent and said other passage, said third valve means normally closing said other passage and normally isolating said vent from said other passage, said third valve means being operable to open said other passage and to permit communication of said other passage with said vent when the pressure in said main reservoir exceeds the pressure in said auxiliary reservoir by a predetermined amount, whereby to vent said main and auxiliary reservoirs to atmosphere during a part of the time said pump is effective for withdrawing air from said auxiliary reservoir, and means for adjusting said third valve means for adjusting the pressure differential rendering said third valve means operable.

14. A pressure regulator comprising a main housing having a top plate and defining a main reservoir, an auxiliary housing overlying a part of said top plate in fluid tight relation therewith and defining an auxiliary reservoir, an inlet in said auxiliary reservoir adapted to be coupled to a cyclically operable pump which is effective for substantially half its cycle of operation to supply air at super atmospheric pressure and is effective to withdraw air during substantially the other half of its cycle of operation, said top plate being provided with a relatively large aperture communicating with both said main and auxiliary reservoirs, a valve associated with said aperture for controlling the flow of air therethrough, means for normally biasing said valve into operative fluid-tight engagement with said plate whereby to normally prevent fluid flow through said aperture, said valve and biasing means being arranged so that said valve moves out of operative engagement with said top plate only when the pressure in said auxiliary reservoir exceeds the pressure in said main reservoir to thereby permit relatively unrestricted air flow through said opening into said main reservoir, said top plate being provided with another relatively large opening defining an outlet, another valve associated with said outlet and operable to a first condition when air flows out of said main reservoir through said outlet and operable to a second condition when air flows into said main reservoir through said outlet, said other valve providing a relatively small outlet opening in said first condition whereby to restrict the flow of air out of said main reservoir therethrough and providing a relatively large outlet opening in said second condition whereby to provide relatively unrestricted flow of air into said main reservoir therethrough, whereby the duration of air flow into said main reservoir through said first opening is shorter than the duration of air flow out of said main reservoir through said outlet, said plate further having a third passage extending therethrough between said main and auxiliary reservoirs, a fourth passage extending from said auxiliary reservoir into said top plate and being out of communication with said main reservoir and a vent extending from said fourth passage to atmosphere; a third valve associated with said third and fourth passages for controlling air flow therethrough, means for normally biasing said valve to a first position in which it closes said third and fourth passages, said third valve being operable to a second position in which said third and fourth passages are open only when the pressure in said main reservoir exceeds the pressure in said auxiliary reservoir by a predetermined amount, whereby to vent said main and auxiliary reservoirs to atmosphere during a part of the pump cycle when the pump is effective for withdrawing air.

15. A pressure regulator comprising a main housing having a top plate and defining a main reservoir, an auxiliary housing overlying a part of said top plate in fluid tight relation therewith and defining an auxiliary reservoir, an inlet in said auxiliary reservoir adapted to be coupled to a cyclically operable pump which is effective for substantially half its cycle of operation to supply air at super atmospheric pressure and is effective to withdraw air during substantially the other half of its cycle of operation, said top plate being provided with a relatively large aperture communicating with both said main and auxiliary reservoirs, a valve associated with said aperture for controlling the flow of air therethrough, means for normally biasing said valve into operative fluid-tight engagement with said plate whereby to normally prevent fluid flow through said aperture, said valve and biasing means being arranged so that said valve moves out of operative engagement with said top plate only when the pressure in said auxiliary reservoir exceeds the pressure in said main reservoir to thereby permit relatively unrestricted air flow through said opening into said main reservoir, said top plate being provided with another relatively large opening defining an outlet, another valve associated with said outlet and operable to a first condition when air flows out of said main reservoir through said outlet and operable to a second condition when air flows into said main reservoir through said outlet, said other valve providing a relatively small outlet opening in said first condition whereby to restrict the flow of air out of said main reservoir therethrough and providing a relatively large outlet opening in said second condition whereby to provide relatively unrestricted flow of air into said main reservoir therethrough, whereby the duration of air flow into said main reservoir through said first opening is shorter than the duration of air flow out of said main reservoir through said outlet, said plate further having a third passage extending therethrough between said main and auxiliary reservoirs, a fourth passage extending from said auxiliary reservoir into said top plate and being out of communication with said main reservoir and a vent extending from said fourth passage to atmosphere; a third valve associated with said third and fourth passages for controlling air flow therethrough, spring means for normally biasing said valve to a first position in which it closes said third and fourth passages, said third valve being operable to a second position in which said third and fourth passages are open only when the pressure in said main reservoir exceeds the pressure in said auxiliary reservoir by a predetermined amount, whereby to vent said main and auxiliary reservoirs to atmosphere during a part of the pump cycle when the pump is effective for withdrawing air and means for adjusting the force of said spring biasing means whereby to adjust said third valve to operate to its second position at a preselected pressure differential within a range of pressure differentials, said adjusting means being accessible from outside said pressure regulator.

References Cited in the file of this patent

UNITED STATES PATENTS

| | | |
|---|---|---|
| 1,069,685 | Fey | Aug. 12, 1913 |
| 1,224,180 | Lake | May 1, 1917 |

FOREIGN PATENTS

| | | |
|---|---|---|
| 482,786 | Great Britain | Apr. 5, 1938 |